PASSIVE SYNCHRONIZED SPIKE GENERATOR WITH HIGH INPUT IMPEDANCE AND LOW OUTPUT IMPEDANCE AND CAPACITOR POWER SUPPLY

Filed Oct. 22, 1965 2 Sheets-Sheet 1

INVENTORS
Ciro A. Cancro,
Paul J. Janniche
BY [signature]
[signature]
ATTORNEYS

June 25, 1968 C. A. CANCRO ET AL 3,390,282

PASSIVE SYNCHRONIZED SPIKE GENERATOR WITH HIGH INPUT IMPEDANCE AND LOW OUTPUT IMPEDANCE AND CAPACITOR POWER SUPPLY

Filed Oct. 22, 1965 2 Sheets-Sheet 2

INVENTORS
Ciro A. Cancro,
Paul J. Janniche

BY

ATTORNEYS

United States Patent Office 3,390,282

Patented June 25, 1968

3,390,282

PASSIVE SYNCHRONIZED SPIKE GENERATOR WITH HIGH INPUT IMPEDANCE AND LOW OUTPUT IMPEDANCE AND CAPACITOR POWER SUPPLY

Ciro A. Cancro, Silver Spring, and Paul J. Janniche, Jr., Lanham, Md., assignors to the United States of America as represented by the Administrator of the National Aeronautics and Space Administration Filed Oct. 22, 1965, Ser. No. 502,739

10 Claims. (Cl. 307—260)

ABSTRACT OF THE DISCLOSURE

A pulse generator for synchronizing or resetting electranic signals without requiring a separate external power source. A storage capacitor stores energy from incoming signals, such energy being utilized to power the pulse generator circuitry. By charging the storage capacitor, triggering a discharge circuit when the input pulse drops to a predetermined level, and developing the output pulse through an amplifier stage which is connected directly to said storage capacitor, the output pulse is rendered independent of the input pulse and the pulse generator needs no external power source.

The invention described herein may be manufactured and used by or for the Government of the United States of America for governmental purposes without the payment of any royalties thereon or therefor.

The present invention relates to a pulse circuit for generating fast rise time pulses, or spikes, in response to the leading or trailing edges of a rectangular input signal having relatively slow rise and fall times.

In generating pulses with rise times in the nanosecond range, the present practice is to feed the input signal to an emitter follower, differentiate the output of this emitter follower and then amplify it. Then feed this amplifier differentiated signal through another emitter follower stage for developing an output signal with impedance matching. It is apparent that these generators include relatively complicated circuitry. Moreover, a source of external power is required for each amplifier stage. Another disadvantage with these prior generators is that the output pulse is dependent upon the shape (slope) of the input pulse and is not independent thereof.

It is a general purpose of the present invention to generate a fast rise-time pulse, or spike, synchronized with the leading or trailing edge of a rectangular input pulse which has relatively slow rise and fall times but which output pulse has a rise time which is independent of the input rise or fall times or shapes. Moreover, the generating circuit of the present invention has a high input impendance and a low output impedance as well as a zero power train.

Briefly stated, a circuit of the present invention comprises a high impedance network including a diode and a resistor for charging a capacitor. When the input signal is applied, charge on the iapacitor builds up and is retained and an associated discharge transistor is biased off. When the input signal drops to a specified level, diodes in the discharge transistor base circuit become forward biased, causing it to conduct. The signal out of the discharge transistor is amplified by additional transistor amplifier stages to provide a sharply rising input signal or spike. The effective supply voltage for the transistor amplifying stages is obtained from the charge of the capacitor which drains exponentially through the transistors, resulting in a corresponding exponential fall in the spike generated.

The output spike may be derived from either the leading or trailing edges of the rectangular input signal depending upon the polarity of the diodes and the type of transistors used. The point during the rise and fall times of the input signal at which the spike is generated is determined by the type and number of diodes used in the discharge transistor base circuit. In addition, a tunnel diode may be used to supply the input to the transistor amplifier stages in order to provide an extremely fast spike independently of the input signal rise time. The circuit may be adapted to operated on input signal pulses with a single polarity swing, such as from common to positive or common to negative, or one that is part positive and part negative.

Thus, it is a primary object of the present invention to provide a sharp differentiating network with high input impedance and low output impedance using zero external power and yielding an output spike whose rise time is independent of the input pulse rise or fall time.

Other and further objects of the present invention will become apparent with the following detailed description when taken in view of the appended drawings in which.

Figure 1:
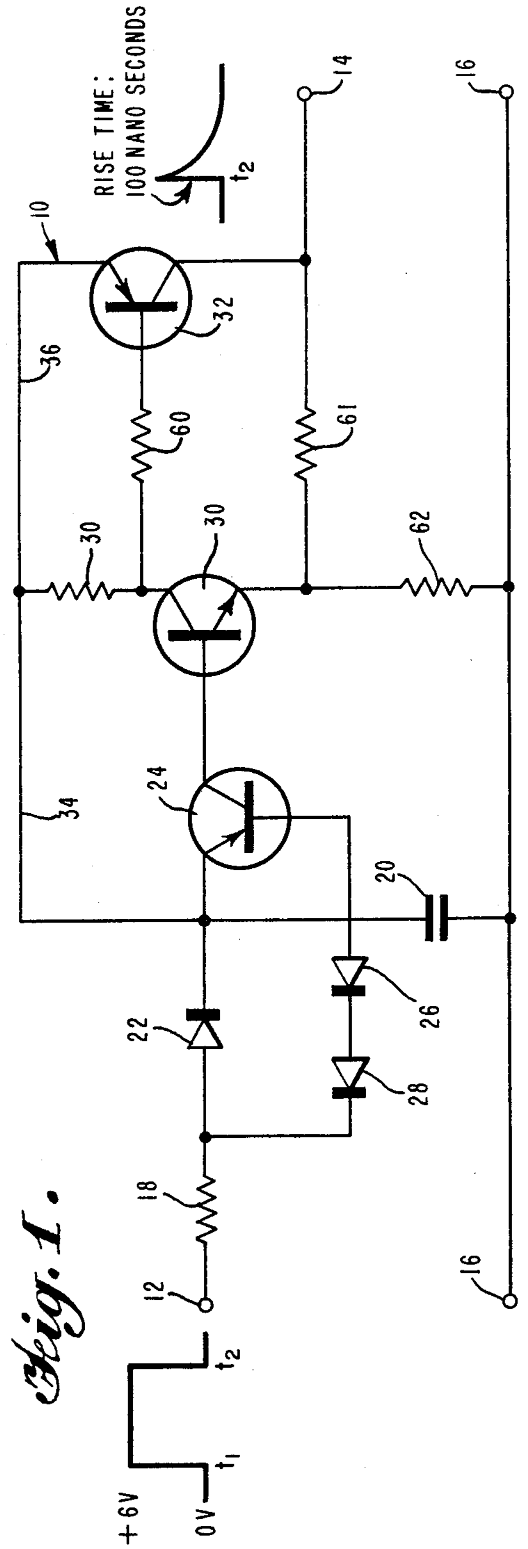
FIGURE 1 is a schematic illustration of a pulse generator according to the present invention.

Referring now to the drawings in detail, there is shown in FIGURE 1 a first embodiment of the invention which generates a positive spike during the fall time interval of a rectangular input signal. The generator, generally indicated as 10, comprises an input terminal 12, an output terminal 14 and a pair of common terminals 16. A high value resistor 18 is connected to input terminal 12 and feeds a charging signal to capacitor 20 through a forward biased diode 22. A PNP discharge transistor 24 has its emitter electrode connected to one side of said capacitor 20 and its base circuit connected through a pair of diodes 26 and 28 to the junction of resistor 18 and diode 22.

The output or collector electrode of transistor 24 is connected to the control circuit of the first amplifier NPN transistor 30 which is in turn cascaded, through current limiting resistor 60, with a second PNP amplifier stage 32. Transistors 30 and 32 receive their operating voltage from the charge on capacitor 20 due to the connection made by leads 34 and 36 and resistor 38. The output of transistor 32 is connected to the output terminal 14, and resistors 61 and 62 determine the gain for transistors 30 and 32. Thus, the value of resistors 61 and 62 set the circuit gain between terminals 14 and 16.

In operation, assume an input pulse is applied which swings from zero to +6 volts and back to zero again. During the time the input signal remains at +6 volts capacitor 20 charges through resistor 18 and forward biased diode 22. The large value of resistor 18 insures a large input impedance for thec ircuit, and the value of C is chosen such that the RC time constant permits C to charge to approximately the full +6 volts during the expected input pulse period.

With the input signal at +6 volts, all transistors are biased off and the capacitor 20, once charged, retains its charge due to the absence of a discharge circuit. When the input signal drops from +6 volts to approximately +4 volts, diodes 26 and 28 become forward biased and at this time, transistor 24 becomes fully conductive. The signal through transistor 24 immediatley turns on amplifier stages 30 and 32 so that a sharply rising output pulse is fed to the output terminal 14. It can be seen that the effective supply voltage for amplifiers 30 and 32 is obtained from the charge on capacitor 20 which quickly drains through transistors 30 and 32 so that the trailing edge of the output pulse falls exponentially.

The circuit of FIGURE 1 yields an output spike at the fall time of a positive going input signal. However, an output spike may be obtained on the rise time of a negative going input pulse by reversing the polarities of all diodes and changing the NPN–PNP designations of the transistors. The point during the fall or rise time of the input signal at which an output spike is obtained is determined by the forward voltage drop across diodes 26 and 28, and this point may be adjusted by changing the number of diodes used in the base circuit of transistor 24 or alternatively, if stability is desired, a Zener diode can be substituted in place of diodes 26 and 28.

Figure 2:
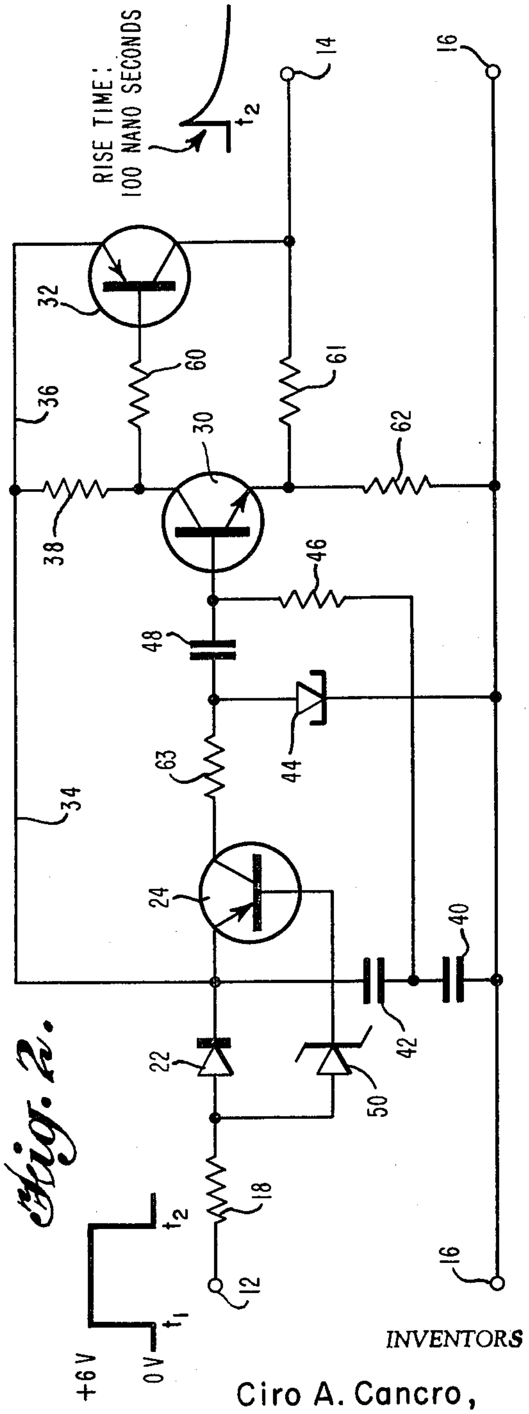
FIGURE 2 is a schematic illustration of yet another embodiment of the present invention.

Referring now to FIGURE 2, there is illustrated a second embodiment of the present invention which generates a spike at the fall time of the input pulse, said spike having a rise time of approximately 100 nanoseconds and being independent of the input signal rise or fall time. It should be understood that like reference numerals refer to like structures and the circuit of FIGURE 2 is similar to that shown in FIGURE 1 except that capacitor 20 is replaced by capacitors 40 and 42, and tunnel diode 44 is connected across the input of amplifier 30. Resistor 63 is connected between the collector of transistor 24 and tunnel diode 44 and its value determines the operating point of the tunnel diode. When charged, the voltage across capacitor 40 is fed through resistor 46 to the base of the transistor 30 and biases the same near conduction. Blocking capacitor 48 is connected between resistor 46 and tunnel diode 44 so that the voltage felt through resistor 46 does not prematurely switch tunnel diode 44 to its high voltage state. Zener diode 50 is connected in the base circuit of transistor 24 and determines the point on the input signal fall time at which transistor 24 conducts and therefore the point at which an output spike is obtained.

When a 6 volt rectangular input signal is applied to input terminal 12, capacitors 40 and 42 charge to the 6 volt level in a manner described above. Discharge transistor 24 conducts at a point of the fall time of the trailing edge of the input pulse determined by the characteristics of the Zener diode 50. The fast and independent output pulse rise time is obtained by the fast switching of tunnel diode 44 to its high voltage state in response to the conduction of transistor 24. Thus, the switching signal is fed into the control or base electrode of the first transistor stage 30 so that transistors 30 and 32 produce the fast rise time output pulse at terminal 14.

Figure 3:
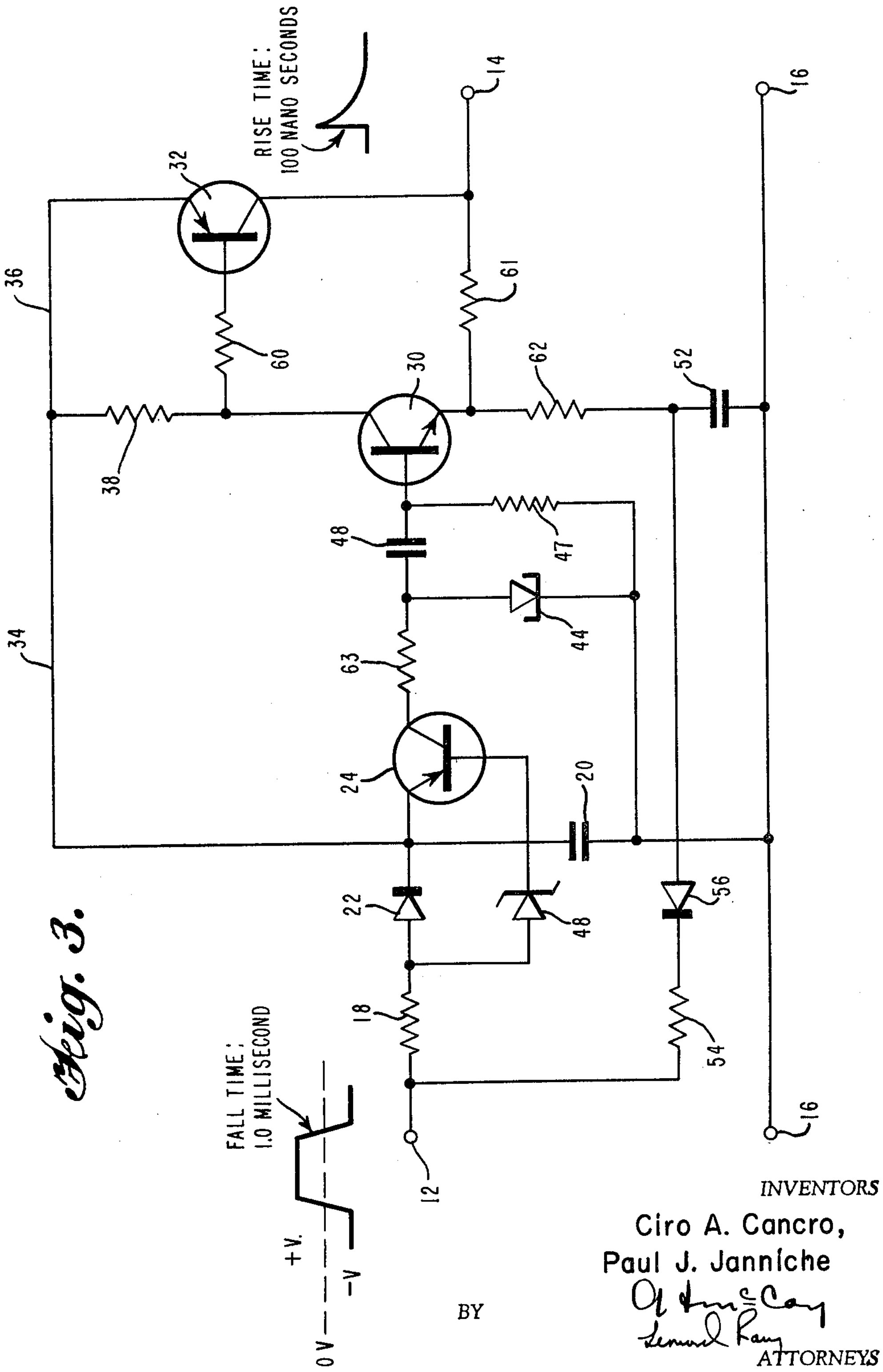
FIGURE 3 is a schematic illustration of yet a third embodiment of the present invention.

The tunnel diode circuit described above and shown in FIGURE 2 operates on an input pulse with a single polarity swing, such as from zero to a positive voltage or from a zero voltage to a negative voltage (with appropriate polarity reversals). Yet another embodiment of the present invention is illustrated in FIGURE 3 wherein the circuit generates a spike in response to input voltages swinging from one polarity to an opposite polarity, and wherein the output spike rise time is about 100 nanoseconds and independent of the input signal rise or fall time. In this embodiment, bias resistor 47 is connected between the base of transistor 30 and common terminal 16 and a capacitor 52 is connected in the emitter circuit of the first transistor amplifier 30. Capacitor 52 is charged during the negative portion of the input pulse through a high value resistor 54 and a forward biased diode 56. The voltage across capacitor 52 biases transistor 30 near conduction. During the positive portion of the input pulse, capacitor 20 charges in the manner described above for the circuit shown in FIGURE 1.

In operation, at the trailing edge (negative going) of the input pulse, discharge transistor 24 begins conducting at a point determined by Zener diode 48. Tunnel diode 44 is immediately switched to its high voltage state and a sharp trigger signal is then fed to transistor 30. Due to the bias supplied by the voltage across capacitor 52, transistors 30 and 32 rapidly conduct thereby emitting a fast rise time output pulse at terminal 14.

It should be understood that the embodiment disclosed herein are examples only of the present invention and that modifications can be made thereto without departing from the spirit and scope of the present invention.

What is claimed is:

1. A pulse circuit for generating fast rise time pulses comprising an input terminal; an output terminal and a common terminal; a first capacitor having a first electrode coupled to said common terminal and a second electrode; a first diode coupled between said input terminal and said second electrode to provide a charging path for said capacitor when the input signal at said input terminal is of a predetermined polarity; a normally nonconducting discharge device having a control electrode, an input electrode connected to said second electrode, and an output electrode; a normally nonconducting two terminal device coupled between said control electrode and the coupling between said first diode and said input terminal for making said discharge device conductive when the voltage across said two terminal device reaches a predetermined magnitude and polarity; and an amplifier stage having an input lead coupled to said discharge device output electrode, a voltage supply lead coupled to said second electrode, and an output lead coupled to said output terminal.

2. A pulse circuit as set forth in claim 1 further comprising a resistor connected in series between said input terminal and said first diode.

3. A pulse circuit as set forth in claim 1 wherein said two terminal device is a Zener diode having one of its electrodes connected to the corresponding poled electrode of said first diode.

4. A pulse circuit as set forth in claim 1 wherein said discharge device comprises a first transistor with its emitter connected to said discharge device input electrode, collector coupled to said discharge device output electrode, and base connected to said discharge device control electrode and wherein said amplifier stage comprises at least one second transistor with its base coupled to said input lead, and having one of its emitter-collector electrodes coupled to said voltage supply lead and the other of its emitter-collector electrodes coupled to said output terminal.

5. A pulse circuit as set forth in claim 1 further comprising another capacitor coupled between said amplifier output lead and said common terminal to bias said amplifier stage near conduction, another diode coupled between said input terminal and said another capacitor for providing a charging path for said another capacitor, a negative resistance device having one electrode coupled to said amplifier input lead and another electrode connected to said common terminal, said diodes poled so that said first capacitor charges when the signal at said input terminal is of one polarity and said another capacitor charges when the signal at said input terminal is of an opposite polarity.

6. A pulse circuit as set forth in claim 5 wherein said negative resistance device is a tunnel diode.

7. A pulse circuit as set forth in claim 1 wherein said two terminal device is a second diode having one of its electrodes connected to the oppositely poled electrode of said first diode.

8. A pulse circuit as set forth in claim 1 wherein said discharge device comprises a first transistor with its emitter connected to said discharge device input electrode, collector connected to said discharge device output electrode, and base connected to said discharge device control electrode and wherein said amplifier stage comprises a first transistor with its base connected directly to said discharge device output electrode, one of its emitter-collector electrodes connected through a resistor to said voltage supply lead and the other of its emitter-collector electrodes coupled to said amplifier output terminal, a second transistor having a base electrode coupled to said one of said emitter-collector electrodes, and emitter connected directly to said amplifier voltage supply lead and a collector connected directly to said amplifier output terminal.

9. A pulse circuit as set forth in claim 1 further comprising a second capacitor connected between said first electrode of said first capacitor and said common terminal, means connected between said amplifier input lead and the junction between said first capacitor and said second capacitor for feeding at least a part of the voltage on said second capacitor to said amplifier input lead, and a negative resistance device having one electrode coupled to said amplifier input lead and another electrode connected to said common terminal.

10. A pulse circuit as set forth in claim 9 wherein said negative resistance device is a tunnel diode.

References Cited

UNITED STATES PATENTS 2,686,263 8/1954 Konick ---------- 328—67 XR

ARTHUR GAUSS, *Primary Examiner.*

S. D. MILLER, *Assistant Examiner.*